US006032460A

United States Patent [19]
Pahl

[11] Patent Number: 6,032,460
[45] Date of Patent: Mar. 7, 2000

[54] TORPEDO WITH EXTERNAL COMBUSTION ENGINE FOR USE WITH CONCENTRATED FUEL

[76] Inventor: Donald A. Pahl, 14940 NE. 204 St., Woodinville, Wash. 98072

[21] Appl. No.: 09/072,954

[22] Filed: May 5, 1998

[51] Int. Cl.[7] .......... F02C 5/00

[52] U.S. Cl. .......... 60/39.6; 60/39.3; 60/39.462; 114/20.2

[58] Field of Search .......... 114/20.2; 60/221, 60/39.26, 39.35, 39.3, 39.462, 39.6, 39.63

[56] References Cited

U.S. PATENT DOCUMENTS 1,036,080 8/1912 Davison .......... 60/39.3

*Primary Examiner*—Noah P. Kamen
*Attorney, Agent, or Firm*—Wiggin & Dana; William B. Slate

[57] ABSTRACT

A vehicle for self-propelled travel through a body of water includes a hull, a propulsive element for engaging the water, an engine, and a fuel storage container. The engine includes a combustion chamber for receiving a monopropellant fuel and combusting the monopropellant fuel to form an energized gas. The engine includes responsive elements for drawing energy from expansion of the energized gas. The responsive elements are coupled to the propulsive element to drive the propulsive element. A fuel flow path extends from the container upstream to the combustion chamber downstream. A pump system pumps the fuel from the container. A port draws water from the body of water through the hull in at least a first mode of operation. A water flow path extends from the port upstream to the combustion chamber downstream in at least the first mode of operation.

10 Claims, 4 Drawing Sheets

TORPEDO WITH EXTERNAL COMBUSTION ENGINE FOR USE WITH CONCENTRATED FUEL

BACKGROUND OF THE INVENTION

1. Field of the Invention

This invention relates generally to external combustion expander-type engines. More particularly, the present invention relates to an external combustion expander-type engine having an expansion chamber between the combustion chamber and hot gas distributor rotary valve.

2. Description of the Art

It is known to propel a torpedo with a propulsion system which uses an external combustion expander-type engine in conjunction with a monopropellant fuel. A monopropellant fuel contains the chemical species necessary for its own combustion or decomposition. A common monopropellant fuel used in United States Navy torpedoes is designated OTTO Fuel II, which uses a nitrated alcohol as its energetic constituent. Otto Fuel II is a mixture of 76% propylene glycol dinitrate, 1.5% 2-Nitrodiphenylamine and 22.5% Di-n-butyl sebacate (by weight). The decomposition of OTTO Fuel II yields approximately 1,100 btu per pound (11,275 btu/gal) at a flame temperature of approximately 2,300° F.

In a conventional propulsion system of this type, a solid propellant initiator charge is first fired into the combustion chamber, producing a hot, energized gas which commences drive action of the torpedo and initiates the entry of a liquid sustainer monopropellant fuel (e.g., OTTO Fuel II) into the combustion chamber through a poppet valve. Heat generated in the combustion of the initiator propellant effects combustion of the initial quantity of sustainer propellant which is admitted to the combustion chamber. Subsequently, combustion of the sustainer fuel continues in a self-sustaining manner due to the high temperature in the chamber, i.e., part of the energy generated in combustion of the sustainer propellant is used to combust additional sustainer propellant.

Combustion of OTTO Fuel II produces a variety of toxic or otherwise harmful emissions. It is also corrosive to torpedo hardware. A number of known fuels represent potential alternative monopropellants. These include combinations of hydroxylammonium nitrate (HAN) or hydroxylammonium perchlorate (HAP)—both oxidizers—with various fuels such as triethanolammonium nitrate (TEAN). Such fuels may be diluted with deionized water to reduce decomposition/combustion temperatures to the 2300° F. requirement of existing torpedo hardware.

SUMMARY OF THE INVENTION

It is an object of the invention to provide an external combustion expander-type engine having improved performance compared with existing OTTO Fuel II-powered torpedoes. It is a further object of the invention to provide such improved performance with minimal modification of existing torpedo hardware. It is a further object of the invention to provide such an engine and fuel combination having a reduced level of toxic emissions and non-condensable exhaust.

Accordingly, in one aspect the invention is directed to a vehicle for self-propelled travel through a body of water. The vehicle includes a hull, a propulsive element for engaging the water, an engine, and a fuel storage container. The engine includes a combustion chamber for receiving a monopropellant fuel and combusting the monopropellant fuel to form an energized gas. The engine includes responsive elements for drawing energy from expansion of the energized gas. The responsive elements are coupled to the propulsive element to drive the propulsive element. A fuel flow path extends from the container upstream to the combustion chamber downstream. A pump system pumps the fuel from the container. A port draws water from the external body of water through the hull in at least a first mode of operation. A water flow path extends from the port upstream to the combustion chamber downstream in at least the first mode of operation.

These and other objects of the invention will become more apparent from the following description.

BRIEF DESCRIPTION OF THE SEVERAL VIEWS OF DRAWING

Like reference numbers and designations in the several views indicate like elements.

DESCRIPTION OF THE PREFERRED EMBODIMENT

Figure 1:
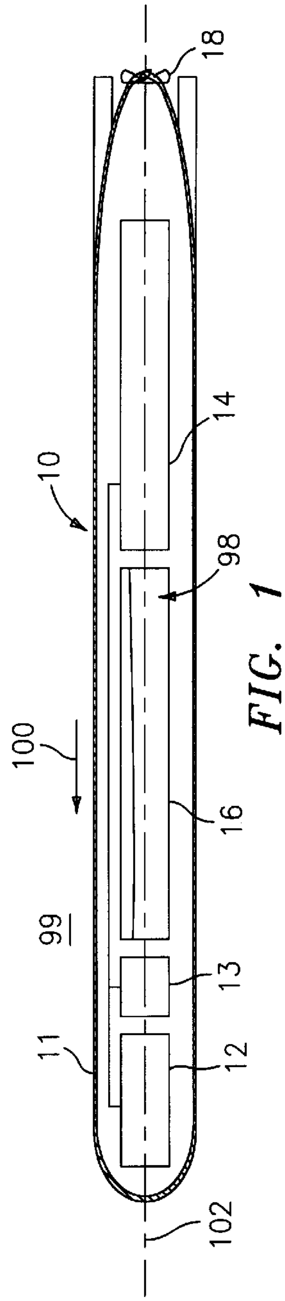
FIG. 1 is a schematic sectional view of a torpedo.

With reference to FIG. 1, a torpedo 10 is designed for self-propelled travel in a forward direction 100 through a body 99 of water. When used in combat, the body of water will typically be an ocean. The torpedo includes a watertight hull 11 containing a warhead 12, a control system 13, an engine 14, and a tank 16 storing a monopropellant fuel 98. The engine is coupled to a propeller 18 to drive the torpedo through the body of water. Other standard elements such as a warhead, a control system, and the like are not shown, but may be present as appropriate.

In the exemplary embodiment, the engine 14 may be generally similar to that disclosed in U.S. Pat. No. 5,219,731 of Anthony W. Duva, the disclosure of which is incorporated herein by reference in its entirety. The invention may, however, be used with other engine configurations. In the exemplary embodiment, the stored fuel 98 consists essentially of 63.3% HAN, 22.0% glycine and 14.7% water (deionized). In this mixture, the water serves primarily as a solvent for the other ingredients. It is advantageous to use the least amount of water capable of dissolving the fuel constituents. The mixture has a combustion temperature of 3140° F. To reduce the combustion temperature to approximately that of OTTO Fuel II, further water may be added. For example, a second mixture of 53.1% HAN, 18.4% glycine and 28.5% water (by weight) would have a theoretical combustion temperature of 2285° F., an acceptable temperature. This second mixture may be obtained by mixing the first mixture with water in a ratio of 5.18:1.00 by weight.

Figure 2:
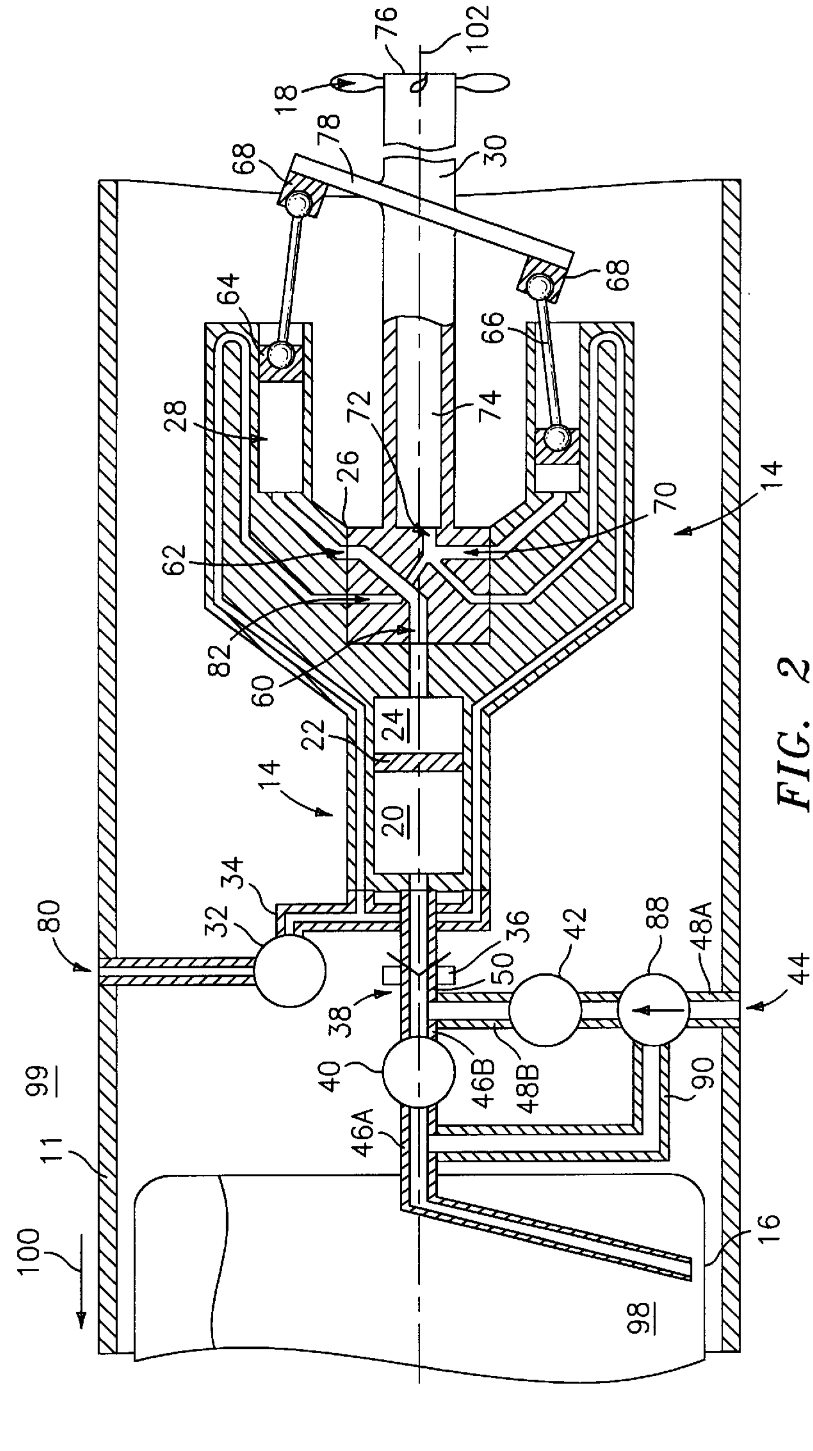
FIG. 2 is a partial schematic sectional view of a torpedo in accordance with the present invention operating in a first mode.

As shown in FIG. 2, the torpedo engine 14 is an external combustion engine having a cylindrical combustion chamber 20 for generating a high-pressure, energized combustion gas from the combusted monopropellant fuel. The energized gas is passed from the combustion chamber 20 through a perforated baffle plate 22 to an expansion chamber 24 in order to reduce the pressure of the gas in an amount sufficient to eliminate pressure pulsations in the engine. The reduced-pressure gas is then transferred through a rotary valve 26, which is carried for rotation about a central longitudinal axis 102 of the torpedo. The valve 26 is connected to the expansion chamber and to six cylinders 28 (of which two are shown) that are arranged around a central drive shaft 30, which is coaxial with, and splined to, the rotary valve 26 along axis 102. The gas is expanded in the cylinders 28 in order to drive the drive shaft. The propeller 18 is positioned at the outer (aft) end of the drive shaft to propel the torpedo after it is launched.

The torpedo has a coolant subsystem which includes a coolant pump 32 and a coolant passage 34 for circulating seawater around the combustion chamber and the cylinders during operation of the engine.

In one mode of operation, the torpedo engine operates in the following manner. Before the torpedo is launched, the combustion chamber 20 is connected to a solid propellant initiator charge (not shown) which is ignited when launch occurs. As the initiator propellant combusts, it generates a hot energized gas which commences drive action of the torpedo engine and opens a poppet valve 36 at a fuel inlet port 38 to the combustion chamber to admit a liquid sustainer propellant into the combustion chamber. The sustainer propellant, which is a monopropellant fuel, may consist of a combination of: (a) stored fuel 98 pumped from the tank 16 by a fuel pump 40; and (b) seawater drawn via a water pump 42 through a water inlet port 44 in the hull 11. By way of example, pumps 40 and 42 may respectively be of the piston type, powered by electrical energy. The flow path for the stored fuel 98 extends from the tank 16 through a conduit having upstream and downstream portions 46A and 46B respectively upstream and downstream of the fuel pump 40. The seawater flow path extends from the port 44 through a conduit having portions 48A and 48B respectively upstream and downstream of the water pump 42. The downstream conduit portions 46B and 48B converge in a conduit 50 in which the poppet valve 36 and engine inlet port 38 are provided. Accordingly, the sustainer propellant entering the engine through the port 38 is the diluted mixture of the stored fuel 98 and seawater (e.g., in a 5.18:1.00 mixture as described above). This sustainer propellant enters the combustion chamber through the poppet valve 36. The heat and pressure generated by combustion of the solid initiator propellant commences combustion of the sustainer propellant to form a hot, high-pressure, energized gas. Commonly, the operating pressure in the combustion chamber is on the order of 800–1000 psi. Thus, both the fuel pump 40 and the water pump 42 must be capable of generating such high pressures at their operating flow rates. As a portion of the energized gas in the combustion chamber 20 is removed from the combustion chamber in a conventional manner, additional sustainer propellant is pumped into the combustion chamber and is combusted due to the high temperature and pressure in the chamber.

As the energized, high pressure gas enters the expansion chamber 24, its pressure is reduced to about 600–800 psi. This pressure drop is brought about by sending the gas through the perforations (not shown) in the baffle plate 22. The perforations each have a cross-sectional configuration in the form of a converging-diverging nozzle.

Reduced-pressure, energized gas is removed from the expansion chamber 24 through an energized gas channel 60 in the rotary valve. The energized gas is distributed through the energized gas channel in sequence to the six cylinders, which are evenly spaced from each other and from the drive shaft. Only two of the six cylinders are seen in FIG. 2. The energized gas is delivered sequentially via the energized gas channel to the inlet 62 of each cylinder. The inlets 62 are positioned around the rotary valve 26 for sequential registry with the channel 60 as the rotary valve rotates about the axis 102. Each cylinder contains a reciprocating piston 64 which is connected by an associated connecting rod 66 to a single non-rotating wobble plate 68. The energized gas which is distributed to the cylinders performs work on the pistons sequentially by individually moving each piston linearly toward the aft end of the torpedo engine. Due to the interconnection of all of the pistons by the tilted wobble plate 68 and swash plate 78 (described below), aftward movement of one particular piston causes an axially opposite piston to move forward. As a particular piston moves forward, it forces spent gas through an exhaust gas channel 70 in the rotary valve in a known manner. The gas in the exhaust gas channel is introduced into an exhaust gas-coolant channel 72 in the rotary valve and is subsequently transferred to an elongated exhaust duct 74 which is located within the drive shaft. The exhaust gas is then emitted from the torpedo into the body of water at the aft end 76 of the exhaust duct 74.

The wobble plate 68 is connected by a bearing (not shown) to a tilted, rotating swash plate 78. The non-rotating, wobbling movement of the wobble plate rotates the swash plate continuously in one direction to drive the central drive shaft, which is rigidly connected to the swash plate in a co-axial arrangement. Rotation of the drive shaft drives the propeller, which is fixed to the aft end of the drive shaft.

The torpedo engine includes a coolant subsystem having a cooling water inlet 80 which is opened after the torpedo is launched. The inlet 80, which is near the combustion chamber, admits seawater into the coolant passage 34. The seawater at inlet 80 is pumped through the coolant passage by the coolant pump 32. The coolant passage includes annular segments formed around the outer surfaces of the combustion chamber and each of the six cylinders. After circulating around the combustion chamber and cylinders, the seawater in passage 34 enters a coolant channel 82 in the rotary valve in a conventional manner and is then transferred into the exhaust gas-coolant channel 72 in the rotary valve, where it is mixed with exhaust gas and is subsequently removed from the torpedo engine with the exhaust gas through the exhaust duct 74.

The combustion chamber 20 and expansion chamber 24 preferably are custom-designed for use under particular process conditions. For ease of construction, the expansion chamber 24 can be formed integrally with the combustion chamber 20 as part of a single large chamber, which is partitioned into two chambers by the baffle plate 22. The expansion chamber can be larger or smaller than the combustion chamber, but should be sufficiently large to result in the reduction, and preferably the substantial elimination, of pressure pulses in the combustion chamber 12.

The invention facilitates an increase in torpedo performance as follows. The concentrated stored fuel 98 may have a density of about 4–6% greater than the diluted sustainer fuel. This allows a larger fuel mass to be stored in a given tank volume. Further, the addition of external water (e.g., about 19.3% of the mass of concentrated fuel carried in the tank) results in a total performance gain of about 23.3% to about 25.3% in an exemplary application using the concentrated HAN/glycine/water blend described above. This performance gain can be used to increase torpedo range, increase torpedo speed, increase torpedo payload, and the like. If a given level of engine output is maintained, then for economy or efficiency, the fuel pump 40 may be provided having a flow rate/capacity reduced from that of a conventional torpedo in proportion to the reduced volume of fuel it is required to pump. For example, it may be about 80–83% that of the pump in an equivalent conventional torpedo. The water pump 42 will be sized according to its required flow rate and thus may be approximately one-fifth the size or capacity of the fuel pump 40.

Figure 3:
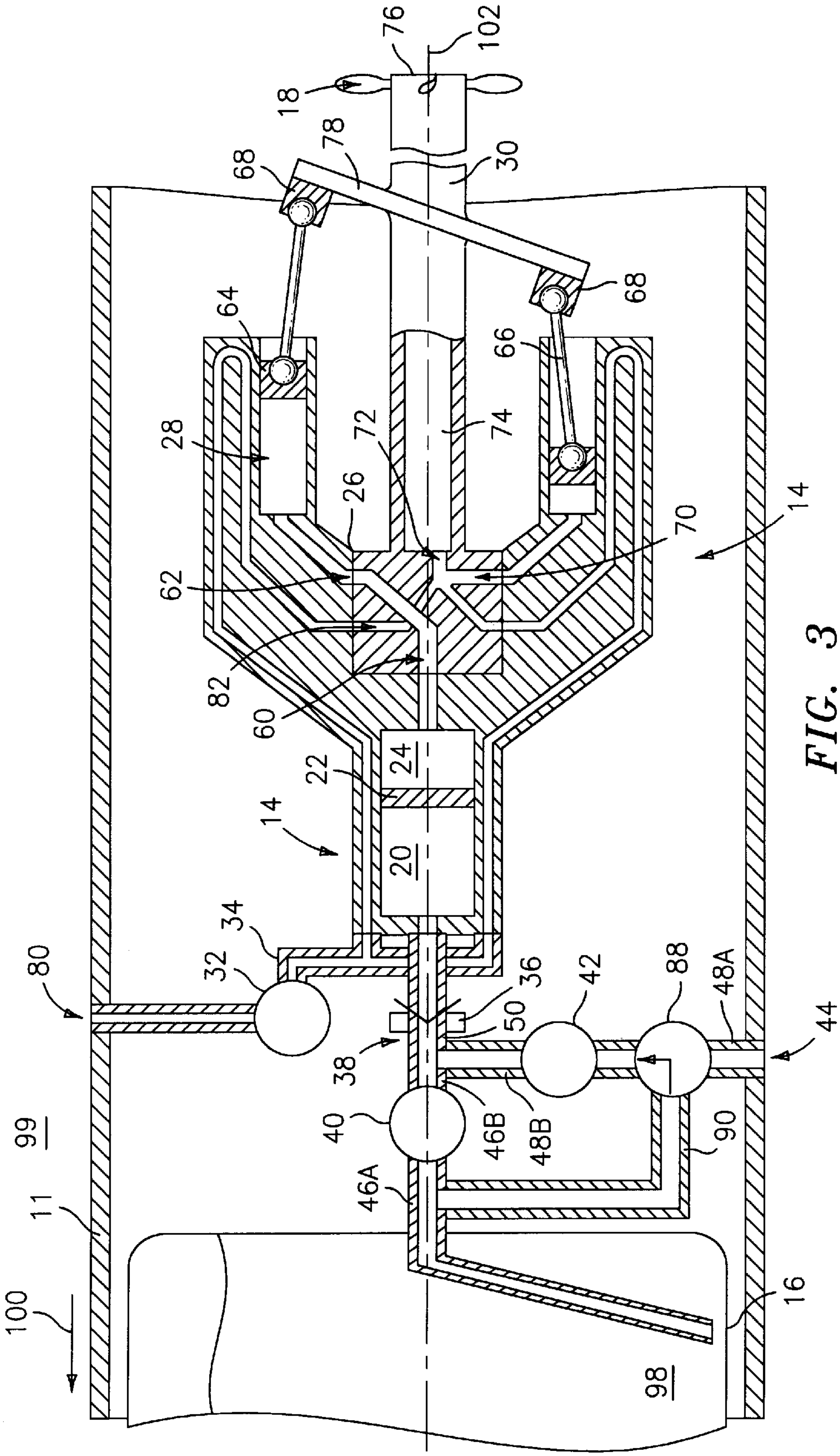
FIG. 3 is a partial schematic sectional view of the torpedo of FIG. 1 operating in a second mode.

To facilitate use in multiple modes, the torpedo may be provided with a valve 88 located in the conduit portion 48A and coupled to a bypass conduit 90 extending therefrom to the conduit portion 46A. In the first mode of operation, valve 88 allows communication straight through the conduit portion 48A and blocks the bypass conduit 90. In a second mode of operation, illustrated in FIG. 3, the valve 88 blocks flow from the port 44 through the conduit portion 48A. In this mode, the valve 88 permits flow from the tank 16 through an upstream section of the conduit portion 46A, through the bypass conduit 90, through the valve 88, and therefrom proceeding through a downstream section of the conduit portion 48A and therefrom through the pump 42 and conduit portion 48B, and so on, as in the first mode. Flow through the fuel pump 40 is as in the first mode. Thus, both pumps 40 and 42 pump stored fuel 98' to the combustion chamber. In this mode of operation, to avoid overheating, the stored fuel 98' is provided having a lower combustion temperature than the stored fuel 98. The stored fuel 98' preferably consists essentially of fuel having the composition of the diluted sustainer propellant described above. In this case, however, the dilution is via the addition of fresh water (in particular deionized or distilled water) rather than seawater and is pre-mixed in the tank 16. As, in the second mode, less total energy may be stored in the given tank 16, the range of the torpedo will be reduced relative to the first mode. However, the torpedo hardware will not be subject to the possible deterioration caused by the combustion of concentrated fuel diluted with seawater. The salts and other contaminants in the seawater can cause corrosion, accumulation of mineral deposits, and other performance deteriorating conditions. The second mode of operation may therefore be useful where it is desired to reuse the torpedo. This may have application in certain training and testing situations.

Figure 4:
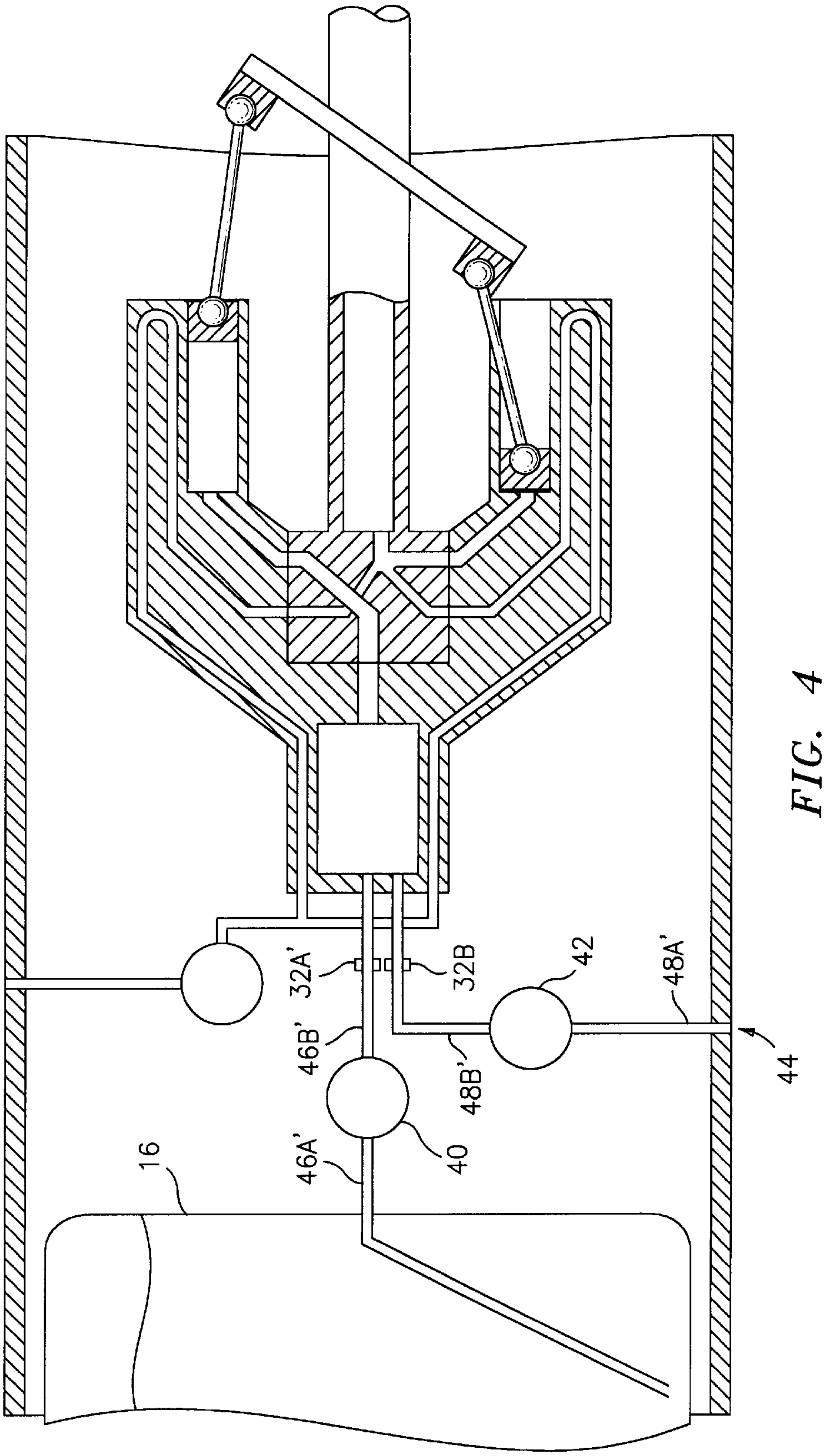
FIG. 4 is a schematic sectional view of another torpedo in accordance with the present invention.

FIG. 4 shows an alternate configuration wherein, rather than converging at a location upstream of the combustion chamber, the respective fuel and water flow paths converge only at the combustion chamber itself. Thus, the fuel conduit extends directly from the tank 16 to the combustion chamber 20', having portions 46A' and 46B' on respective upstream and downstream sides of the pump 40 and a fuel poppet valve 32A' in the section 46B'. Similarly, the water conduit extends from the inlet port 44 to the combustion chamber 20' having portions 48A' and 48B' respectively upstream and downstream of the water pump 42 and a water poppet valve 32B' in the portion 48B'. Other aspects of this embodiment may be the same as that of FIG. 2. This configuration is advantageous in that it is particularly well suited for use with non-water-based fuels. Certain non-water-based fuels (e.g., fuels similar to Otto Fuel II but having higher energy content and combustion temperature) might not adequately mix with water in the embodiment of FIG. 2. Accordingly, the separate injection of the water into the combustion chamber allows for the combustion gas cooling (e.g., to about 2300° F.) while overcoming the inability to directly mix the water and fuel.

Figure 5:
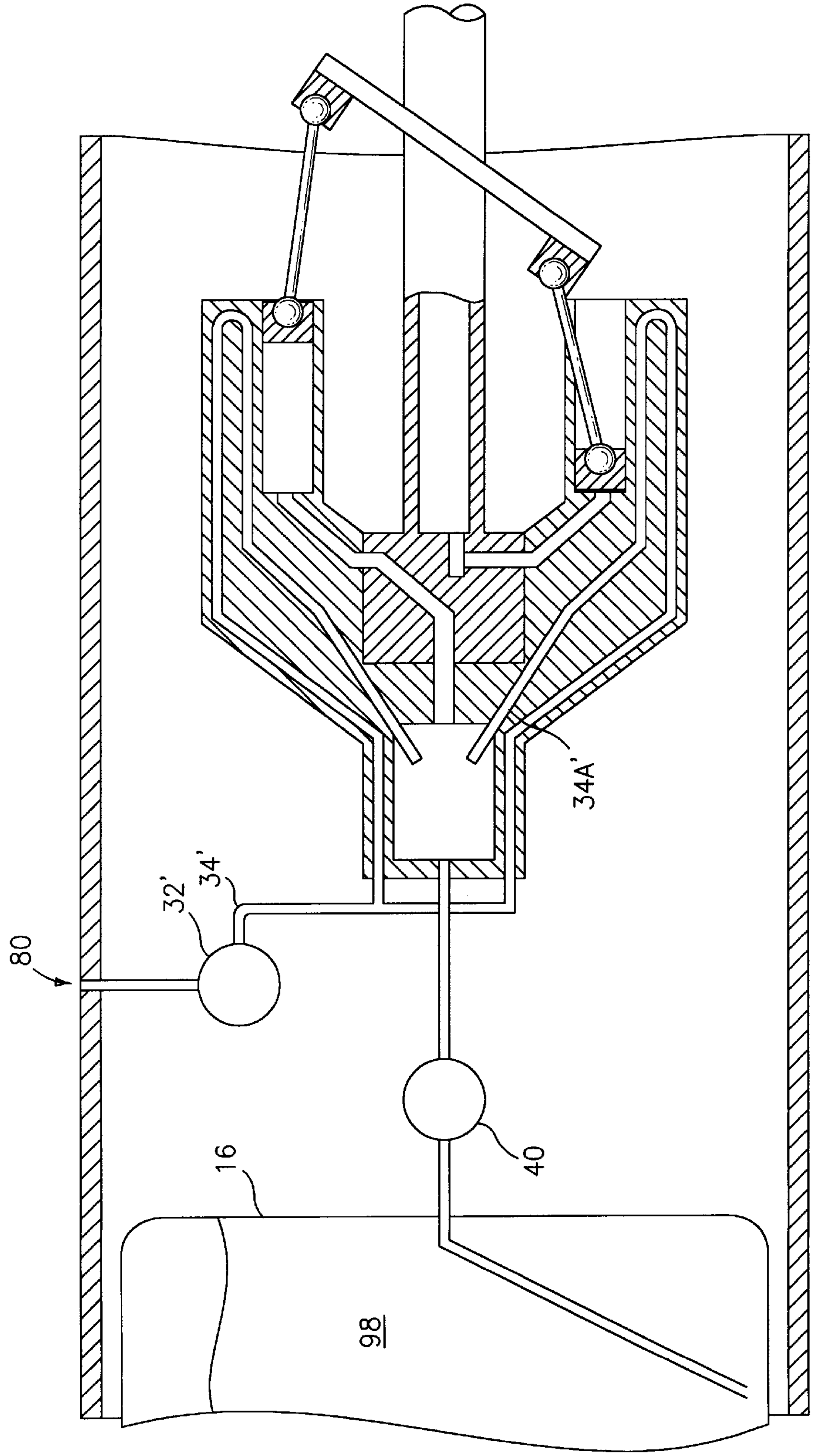
FIG. 5 is a partial schematic sectional view of yet another torpedo in accordance with the present invention.

FIG. 5 shows another alternate configuration wherein the cylinder cooling and fuel dilution functions are combined. Rather than the separate pumps 32 and 42 of the embodiment of FIG. 2 and their associated plumbing, a single pump 32' is provided to draw water through the inlet 80. The pump 32' has the high pressure capabilities of the pump 42 rather than the lower pressure capabilities of the pump 32. The conduit passage 34' may be constructed in similar fashion to the passage 34 with a requirement to withstand enhanced pressures. The passage 34' similarly includes annular segments formed around the outer surfaces of the combustion chamber and each of the six cylinders thus defining a cooling jacket. After circulating around the combustion chamber and cylinders to cool them, the seawater in the passage 34' is directed into the combustion chamber through terminal nozzle portions 34A' of the passageway rather than directly entering the rotary valve to be discharged from the torpedo. By recovering heat from the combustion chamber and cylinders, the injected water improves the thermal efficiency of the engine. The energy contained in the heated coolant water raises the combustion temperature above that achieved with ambient temperature seawater. This allows even more water to be injected to reduce the gas temperature back down to within the required limit, further enhancing performance. This configuration may be particularly achievable as a retrofit of existing hardware. For retrofit application, it is advantageous that the preexisting cooling jacket can withstand the higher pressure associated with use of the pump 32' over the pump 32. It is also advantageous that the minimum flow of water required for cooling via the cooling jacket is less than the desired amount for fuel dilution/combustion gas cooling. If not, the flow can be split with a portion being injected into the combustion chamber and a portion venting directly out the rotary valve through coolant channel 82 (FIG. 2).

Although one or more embodiments of the present invention have been described, it will nevertheless be understood that various modifications may be made without departing from the spirit and scope of the invention. For example, the invention may be applied to a wide variety of engine configurations and with a wide variety of fuel compositions. Although an exemplary fuel containing glycine has been described, other suitable water-soluble organic fuels may include other constituents including TEAN, either alone or in appropriate combinations. While illustrated as applied with a monopropellant, the system may be adapted for use with a bipropellant fuel system with separately stored energetic constituents (e.g., hydrazine) and oxidizer (e.g., nitrogen tetroxide). Accordingly, other embodiments are within the scope of the following claims.

What is claimed is:

1. A vehicle for self-propelled travel through a body of water, comprising:

- a hull;
- a propulsive element for engaging the water in the body of water to propel the vehicle through the body of water;
- an engine, comprising:
  - a combustion chamber for receiving a fuel and combusting the fuel to form an energized gas; and
  - at least one responsive element for drawing energy from expansion of the energized gas and coupled to the propulsive element to drive the propulsive element;
- a fuel storage container for storing the fuel prior to combustion of such fuel;
- a fuel flow path extending from the container upstream to the combustion chamber downstream;

a pump system for pumping the fuel from the container;

a port for drawing water from the body of water through the hull in at least a first mode of operation; and a water flow path extending from the port upstream to the combustion chamber downstream in at least the first mode of operation and wherein in the first mode of operation the fuel flow path and the water flow path converge at a junction upstream of the combustion chamber and form a combined flow path for carrying a mixture of the monopropellant fuel and the water drawn through the port.

2. A torpedo for self-propelled travel through a body of water, comprising:

a hull;

a propeller carried for rotation about a propeller axis for engaging the water in the body of water to propel the torpedo through the body of water;

an external combustion expander-type engine, comprising:

a combustion chamber for receiving a monopropellant fuel and combusting the monopropellant fuel to form an energized gas;

a cylinder fluidly coupled to the combustion chamber for receiving the energized gas from the combustion chamber, the cylinder having a piston disposed therein, the energized gas being expanded in the cylinder to move the piston;

a drive shaft driven by the piston and coupled to the propeller to drive the propeller about the propeller axis;

an exhaust passage formed in the drive shaft for removing spent gas from the engine; and a rotary valve for transferring the energized gas from the combustion chamber to the cylinder and the expanded gas from the cylinder to the exhaust passage;

a fuel storage container for storing the monopropellant fuel prior to combustion of such monopropellant fuel;

a fuel flow path extending from the container upstream to the combustion chamber downstream;

a pump system for pumping the monopropellant fuel from the container;

a port for drawing water through the hull in at least a first mode of operation; and a water flow path extending from the port upstream to the combustion chamber downstream in at least the first mode of operation and wherein in the first mode of operation, the fuel flow path and the water flow path converge at a junction upstream of the combustion chamber and form a combined flow path for carrying a mixture of the monopropellant fuel and the water drawn through the port.

3. The torpedo of claim 2 wherein the monopropellant fuel and water are adapted so that when mixed in the first mode of operation provide a combustion temperature of about 2,300° F.

4. A torpedo for self-propelled travel through a body of water, comprising:

a hull;

a propeller carried for rotation about a propeller axis for engaging the water in the body of water to propel the torpedo through the body of water;

an external combustion expander-type engine, comprising:

a combustion chamber for receiving a monopropellant fuel and combusting the monopropellant fuel to form an energized gas;

a cylinder fluidly coupled to the combustion chamber for receiving the energized gas from the combustion chamber, the cylinder having a piston disposed therein, the energized gas being expanded in the cylinder to move the piston;

a drive shaft driven by the piston and coupled to the propeller to drive the propeller about the propeller axis;

an exhaust passage formed in the drive shaft for removing spent gas from the engine; and a rotary valve for transferring the energized gas from the combustion chamber to the cylinder and the expanded gas from the cylinder to the exhaust passage;

a fuel storage container for storing the monopropellant fuel prior to combustion of such monopropellant fuel;

a fuel flow path extending from the container upstream to the combustion chamber downstream;

a pump system for pumping the monopropellant fuel from the container;

a port for drawing water through the hull in at least a first mode of operation; and a water flow path extending from the port upstream to the combustion chamber downstream in at least the first mode of operation and wherein in the first mode of operation the water flow path defines a cooling jacket for extracting heat from the engine.

5. The torpedo of claim 4, wherein in the first mode of operation, the fuel flow path and the water flow path are entirely separate upstream of the combustion chamber.

6. A torpedo for self-propelled travel through a body of water, comprising:

a hull;

a propeller carried for rotation about a propeller axis for engaging the water in the body of water to propel the torpedo through the body of water;

an external combustion expander-type engine, comprising:

a combustion chamber for receiving a monopropellant fuel and combusting the monopropellant fuel to form an energized gas;

a cylinder fluidly coupled to the combustion chamber for receiving the energized gas from the combustion chamber, the cylinder having a piston disposed therein, the energized gas being expanded in the cylinder to move the piston;

a drive shaft driven by the piston and coupled to the propeller to drive the propeller about the propeller axis;

an exhaust passage formed in the drive shaft for removing spent gas from the engine; and a rotary valve for transferring the energized gas from the combustion chamber to the cylinder and the expanded gas from the cylinder to the exhaust passage;

a fuel storage container for storing the monopropellant fuel prior to combustion of such monopropellant fuel;

a fuel flow path extending from the container upstream to the combustion chamber downstream;

a pump system for pumping the monopropellant fuel from the container;

a port for drawing water through the hull in at least a first mode of operation;

a water flow path extending from the port upstream to the combustion chamber downstream in at least the first mode of operation; and a valve in the water flow path and wherein in a second mode of operation the water flow path is blocked by the valve so that no water from the body of water flows along the water flow path to the combustion chamber.

7. The torpedo of claim 6 wherein, for operation in the first mode of operation, the monopropellant fuel is provided in a first composition having a first combustion temperature and in the second mode of operation, the monopropellant fuel is provided in a second composition having a second combustion temperature, lower than the first temperature and approximately equal to a combustion temperature of a mixture of the monopropellant fuel and water actually combusted in the first mode of operation.

8. A torpedo for self-propelled travel through a body of water, comprising:

a hull;

a propeller carried for rotation about a propeller axis for engaging the water in the body of water to propel the torpedo through the body of water;

an external combustion expander-type engine, comprising:

a combustion chamber for receiving a monopropellant fuel and combusting the monopropellant fuel to form an energized gas;

a cylinder fluidly coupled to the combustion chamber for receiving the energized gas from the combustion chamber, the cylinder having a piston disposed therein, the energized gas being expanded in the cylinder to move the piston;

a drive shaft driven by the piston and coupled to the propeller to drive the propeller about the propeller axis;

an exhaust passage formed in the drive shaft for removing spent gas from the engine; and a rotary valve for transferring the energized gas from the combustion chamber to the cylinder and the expanded gas from the cylinder to the exhaust passage;

a fuel storage container for storing the monopropellant fuel prior to combustion of such monopropellant fuel;

a fuel flow path extending from the container upstream to the combustion chamber downstream;

a pump system for pumping the monopropellant fuel from the container;

a port for drawing water through the hull in at least a first mode of operation; and a water flow path extending from the port upstream to the combustion chamber downstream in at least the first mode of operation wherein, for operation in the first mode of operation, the monopropellant fuel consists essentially of:

water;

an oxidizer; and a water-soluble organic fuel component.

9. The torpedo of claim 8 wherein:

said oxidizer is selected from the group consisting of HAN, HAP and mixtures thereof; and said fuel component is selected from the group consisting of TEAN, glycine, and mixtures thereof.

10. The torpedo of claim 8 wherein:

said oxidizer is HAN; and said fuel component is glycine.

* * * * *